US005659322A

United States Patent [19]

Caille

[11] Patent Number: 5,659,322

[45] Date of Patent: Aug. 19, 1997

[54] VARIABLE SYNTHESIZED POLARIZATION ACTIVE ANTENNA

[75] Inventor: Gérard Caille, Tournefeuille, France

[73] Assignee: Alcatel N.V., Amsterdam, Netherlands

[21] Appl. No.: 161,273

[22] Filed: Dec. 3, 1993

[30] Foreign Application Priority Data

Dec. 4, 1992 [FR] France .................................. 92 14661

[51] Int. Cl.[6] ............................................ G01S 13/00

[52] U.S. Cl. ............................................ 342/188

[58] Field of Search .................................. 342/188, 157, 342/361, 371

[56] References Cited

U.S. PATENT DOCUMENTS

| | | | |
|---|---|---|---|
| 3,022,506 | 2/1962 | Goebels, Jr. et al. . | |
| 3,357,013 | 12/1967 | Hart et al. . | |
| 4,063,248 | 12/1977 | Debski . | |
| 4,737,793 | 4/1988 | Munson . | |
| 5,270,719 | 12/1993 | Roth | 342/157 |
| 5,337,058 | 8/1994 | Cross | 342/188 |

FOREIGN PATENT DOCUMENTS

| | | |
|---|---|---|
| 0470786A3 | 2/1992 | European Pat. Off. . |
| 9113444 U | 2/1992 | Germany . |

OTHER PUBLICATIONS

French Search Report FR 9214661.

*Primary Examiner*—Mark Hellner
*Attorney, Agent, or Firm*—Sughrue, Mion, Zinn, Macpeak & Seas

[57] ABSTRACT

The invention concerns a microwave transmit/receive (T/R) circuit for a polarization synthesizer array antenna, especially a radar antenna. According to the invention the required polarization is obtained by applying two signals to an array element on two orthogonal feed paths with a variable phase difference between the two paths, both of which function simultaneously. In a preferred embodiment both transmit channels are provided with two power amplifiers which each amplify a signal from an in-phase power divider or a hybrid coupler, with a one-bit or two-bit controllable phase-shifter adding a phase-shift of 0°, 90° or 180° to synthesize orthogonal linear or circular polarizations. In a preferred embodiment the circuit according to the invention is partly or entirely implemented in monolithic (MMIC) technology. The invention also concerns an antenna including a T/R circuit as specified hereinabove.

18 Claims, 6 Drawing Sheets

VARIABLE SYNTHESIZED POLARIZATION ACTIVE ANTENNA

BACKGROUND OF THE INVENTION

The invention concerns active antennas constituted by a large number of array elements excited by microwave transmit power amplifiers and the received signals from which are amplified by low-noise receive amplifiers. These antennas are used in diverse applications including telecommunications and radar; the invention is particularly advantageous in the case of radar. In the field of radar, the usual monostatic radar architecture uses a transmit channel and a receive channel connected to the same array element. A switch is usually employed to select the transmit channel to send a pulsed radar signal, the interval between the pulses transmitted being used to receive radar echoes returned from the environment after selecting the receive channel.

DESCRIPTION OF THE RELATED ART

In the field of telecommunications, increasing demand calls for more efficient use of the radio frequency spectrum. This leads to the use of thin, steerable beams which are sometimes polarized to enable frequency re-use. These features can be combined with advantage in array antennas. The invention has an application to array antennas for telecommunications, and especially, but not exclusively, to transmit antennas.

In the field of multistatic radar, transmit and receive antennas are spaced from each other by tens or even hundreds of kilometers. Array antennas can be designed to combine the transmit and receive functions or to fulfil only one of these functions. There is a variant of the invention to cover each of these possibilities.

Active antennas for monostatic radar have changed considerably in recent years and in the current state of the art the array elements are connected to active transmit/receive (T/R) modules which use monolithic microwave integrated circuit (MMIC) or hybrid technology. Transmit/receive switching is usually included in the active module, a schematic of which is shown in FIG. 1, together with its location in the antenna.

FIG. 1 is a diagrammatic representation of an active radar antenna operating alternately in transmit mode and in receive mode. Alternation of the transmit and receive functions is achieved by switches 25, 52 controlled by a synchronization clock 24. In FIG. 1 orthogonal polarizations can be selected in transmit or receive mode by a switch 26. The phase and the gain in transmit or receive mode are controlled by control means 23. The control inputs for a given receive channel are not necessarily the same for the same channel in transmit mode.

FIG. 1 shows a single transmit/receive active module including a controllable phase-shifter 27 and a controllable attenuator 28 for varying the gain of the module. A respective active module is required for each channel, however, and in this example there are m.m' channels each connected to an array element comprising K individual "patches" $S^1_{ij}$ to $S^k_{ij}$ where m'0 is the number of columns of array elements, only the first and part of the last of which are shown.

In transmit mode the transmitter 21 feeds signals to a divider/combiner 22 which feeds the active T/R modules. The phase and the attenuation of the signal are determined by the controllable phase-shifter 27 and the controllable attenuator 28 on the basis of instructions given by the control computer 23. The switches 25 and 52 are then operated by the clock 24 to select the power channel and the signal is amplified by the power amplifier 29 and then fed to the array elements $S_{ij}$.

In receive mode the receiver 31 receives signals from the active T/R modules via the combiner/divider 22. In the T/R modules the signals from the array elements $S_{ij}$ are switched to the receive channel by the switches 25, 52 and pass through a low-noise amplifier 30. A phase-shift and attenuation are then applied by the controllable phase-shifter 27 and the controllable attenuator 28 under the control of the control computer 23.

With this configuration the controllable phase-shifters enable the transmit or receive beam to be scanned electronically. The controllable phase-shifters and attenuators enable the beams to be shaped, for example with sharp edges and weak secondary lobes, to improve the performance of the antenna in terms of ambiguous echoes and in the presence of noise. Finally, the switch 26 can select one of two orthogonal polarizations, which is beneficial in the case of radar as the wanted signal and the noise vary differently according to the polarization which means that the signal to noise ratio can be optimized by varying the polarization.

The performance of a radar is essentially characterized by a link balance which determines the ratio of the wanted signal to the unwanted noise. The following terms depend on the microwave part of the radar:

$$M=N.P_e-L_e+D_e+D_r-L_r-FB$$

where:

M is the figure of merit of the antenna,

N is the number of power amplifiers, $P_e$ represents the output power of each amplifier, $L_e$ represents the losses on the output side of the power amplifier(s), $D_e$ and $D_r$ respectively represent the directivity of the transmit and receive diagrams produced by the array of radiator elements, $L_r$ represents the losses on the input side of the receive low-noise amplifier(s), and FB represents the noise factor of the receive subsystem.

If the gain of the first receive low-noise amplifier is sufficiently high, the noise factor of the receive subsystem is virtually equal to the noise factor of the low-noise amplifier.

The best figure of merit is achieved by minimizing the losses and the noise factor of the receive subsystem and by optimizing the transmit power and the directivity of the radiating diagrams. For a given unit power $P_e$ of an array element the directivity and the term in $N.P_e$ can be optimized with a greater number of elements.

In the context of the present invention the array elements are capable of polarized radiation with at least two orthogonal polarizations, for example horizontal (H) and vertical (V), or right and left (R, L) circular polarizations.

Square, circular and hexagonal mouth horn array elements can generate H or V polarizations. They are particularly suitable for high-power antennas where weight is not a critical consideration.

Printed circuit array elements, known as patches, are photo-chemically etched metal lands on a thin dielectric substrate which has low losses at microwave frequencies. Antenna panels including a large number of elements can be made from them and can be thin, light in weight and even conformable. To generate orthogonal polarizations using patches it suffices to excite them at two points offset 90° relative to the center of the patch, as shown in FIG. 1. The connection between the active T/R module and the patch can be a coaxial line or a microstrip line, for example. If a single active T/R module has to drive a plurality of patches they can be grouped into subarrays connected to the active T/R module by microstrip line distributors for each of the H and V polarizations.

To generate circular polarizations to be radiated by patches the excitations can be the same as for generating orthogonal linear polarizations except that the orthogonal linear excitations must be offset 90° in phase in addition to their 90° physical offset around the center of the patch. This is readily achieved using a 90° hybrid coupler between the active T/R module and the patch which is excited on one input to produce right circular polarization and on the other input to produce left circular polarization.

The use of orthomodes and polarizers to excite horn antennas with circular polarizations is known. These techniques are very familiar to the person skilled in the art and need not be described in more detail in order to explain the present invention.

Referring to the FIG. 1 configuration, modifications to improve the figure of merit of the antenna by reducing the losses of the circuit between the array elements and the amplifiers are known. Firstly, the T/R (transmit/receive) switches nearest the elements (52 in FIG. 1) can be replaced with circulators which, although they are heavier and more bulky, have lower losses and Greater power handling. Secondly, switching between the H and V polarizations can be done on the input side of the power amplifier, as shown in FIG. 2. This reduces the losses $L_e$ and $L_r$ but requires these amplifier subsystems to be duplicated, as shown in FIG. 2.

In FIG. 2 the same components have the same reference symbols as in FIG. 1 but the reference symbols relating to one or other of the amplifier subsystems have a subscript identifying the subsystem to which they belong: subscript "a" for the H subsystem and subscript "b" for the V subsystem. The phase and attenuation are again controlled by the control means 23 and the control of the H or V polarization and transmit/receive selection are under the control of the clock 24, the output of which is connected to the polarization switch 26 and to the two T/R switches 25*a*, 25*b*.

The FIG. 2 circuit also includes additional protection for the low-noise amplifiers against any unwanted reflections from the array elements $S^k_{ij}$ due to antenna mismatch when they are driven by the power amplifiers. The protection is provided by the grounding switches 32*a*, 32*b* at the inputs of the low-noise amplifiers. These switches are also controlled by the clock 24, and operate at the same time as and are synchronized with the T/R switches 25*a*, 25*b*. The optional isolators 33*a*, 33*b* ground the power reflected (a second time) by the protection system 32*a*, 32*b*.

With the switches 25*a*, 25*b* set to the transmit position one or other of the microwave power amplifiers 29*a* or 29*b* is selected, according to the setting of the polarization switch 26.

The microwave circularors 52*a*, 52*b* advantageously replace the switch 52 of the FIG. 1 active T/R module in the respective H, V amplifier subsystems. The insertion losses of the circulators are lower than the losses of the conventional switches used in the active T/R modules.

With the switches 25*a*, 25*b* and where applicable 32*a*, 32*b* set to the receive position one or the other of the microwave low-noise amplifiers 30*a* or 30*b* is selected, according to the setting of the polarization switch 26.

These prior art systems, as described here, have various major drawbacks due to the various switches for selecting transmit/receive, H/V polarization and R/L circular polarization.

In a first prior art solution the switches are between the amplifiers and the array elements (FIG. 1) and contribute heavily to the radar link balance (or the figure of merit of the active antenna) because of their losses $L_e$ and $L_r$ which are operative twice over, i.e. on transmission and on reception.

In a second prior art solution the switches are on the input side of the power amplifiers and on the output side of the low-noise amplifiers (FIG. 2) and this first problem is avoided, but two amplifiers of each type are then required for each array element, only one out of four of which is operative at any one time, the amplifiers operating turn and turn about according to the polarization and to the mode (transmit or receive). The size and weight of the active T/R module are increased, but not the power. The figure of merit is improved because the losses are reduced since there is no longer any polarization switch which switches at high levels. This is particularly disadvantageous in the case of radar systems on satellites and aircraft, especially the former. Also, the active T/R modules of FIG. 2 could very likely cost almost twice as much as those of FIG. 1.

SUMMARY OF THE INVENTION

The invention can overcome these drawbacks of the prior art. The invention proposes an active T/R module configuration which, for the same power, avoids the losses due to the switches of the first prior art solution without increasing the mass and size of the system, as in the second prior art solution.

With these aims in view, the invention proposes an alternate transmit/receive (T/R) microwave circuit for variable synthesized polarization array antennas adapted to supply excitation signals for at least two orthogonal polarizations to array elements via two respective channels fed by two respective transmit power amplifiers and to receive at least two signals having orthogonal polarizations detected by the same array elements and feeding two low-noise receive amplifiers and further comprising, in addition to the phase-shifter on the common channel for depointing and shaping the beam, at least one controllable phase-shifter on a transmit channel and at least one controllable phase shifter on a receive channel adapted to select the polarization, characterized in that the two power amplifiers operate simultaneously during transmission and in that the two low-noise amplifiers operate simultaneously during reception.

The H (horizontal) and V (vertical) polarizations are preferably obtained as the sum or difference of two orthogonal polarizations inclined at 45° to the horizontal: each is connected directly to one of the two channels of the T/R circuit.

The two power amplifiers are preferably fed by an in-phase power divider to facilitate synthesis of orthogonal linear polarizations; the two power amplifiers are advantageously fed by a hybrid coupler having two outputs with a relative phase difference of 90° to facilitate synthesis of circular polarizations.

Said phase-shifters are preferably one-bit digital controllable phase-shifters and the value of said one bit represents either 0° or 180° .

Alternatively, said phase-shifters are one-bit digital controllable phase-shifters and the value of said one bit represents either 0° or 90° .

Alternatively, said phase-shifters are two-bit digital controllable phase-shifters and the value of a first bit represents either 0° or 180° and the value of the second bit represents either 0° or 90° .

In this case any of the following four standard polarizations can be synthesized: linear H or V, right or left circular.

A controllable attenuator is advantageously used to vary the gain of at least one of said power amplifiers.

A controllable attenuator is advantageously used to vary the gain of at least one of said low-noise amplifiers.

Said T/R circuit preferably further comprises at least two quasi-continuously controllable phase-shifters and at least two quasi-continuously controllable attenuators for synthesizing any linear, circular or elliptical polarization.

Said phase-shifters and said attenuators are preferably controllable quasi-continuously in the analog domain.

Alternatively, said phase-shifters and said attenuators are controllable quasi-continuously in the digital domain using a large number of bits for synthesizing any linear, circular or elliptical polarization.

The invention also concerns an antenna that comprises any embodiment of the transmit/receive circuits as defined hereinabove.

The antenna preferably comprises printed circuit (patch) type array elements.

Alternatively, the antenna comprises array elements in the form of annular slots photo-chemically etched on one side of a dielectric substrate having low losses at microwave frequencies and excited by photo-chemically etched lines on the opposite side.

The annular slots are preferably excited by lines photo-chemically etched on a suspended substrate.

The T/R circuits may be implemented in the MMIC technology.

Miniature circularors may be added to the MMIC to increase the maximum rated power.

Miniature duplexers comprising a circulator and an isolator are preferably added to the circuits of the invention to improve isolation of the transmit channels from the receive channels.

The antenna according to the invention is preferably an adaptive polarization antenna, so that a usable radar signal can be obtained in the presence of jamming having any fixed polarization; to achieve this the antenna detects the polarization of the jammer and adapts the phase and possibly the amplitude of the transmitted signals to use a polarization orthogonal to that of the jammer.

BRIEF DESCRIPTION OF THE DRAWINGS

Other features and advantages of the present invention emerge from the following detailed description and the associated drawings appended hereto in which.

All the figures are given by way of non-limiting example; the person skilled in the art knows how to generalize from these specific examples to many other implementations, without departing from the scope of the invention.

The same reference symbols denote the same components in all the figures; these components are microwave functions organized into a schematic block diagram of the circuit. If a given function can be implemented by one of several components to achieve a similar result, this is indicated in the description. Likewise the figures are general schematics and other variants of them can be derived without departing from the scope of the invention.

DETAILED DESCRIPTION OF THE PREFERRED EMBODIMENTS

Figure 1:
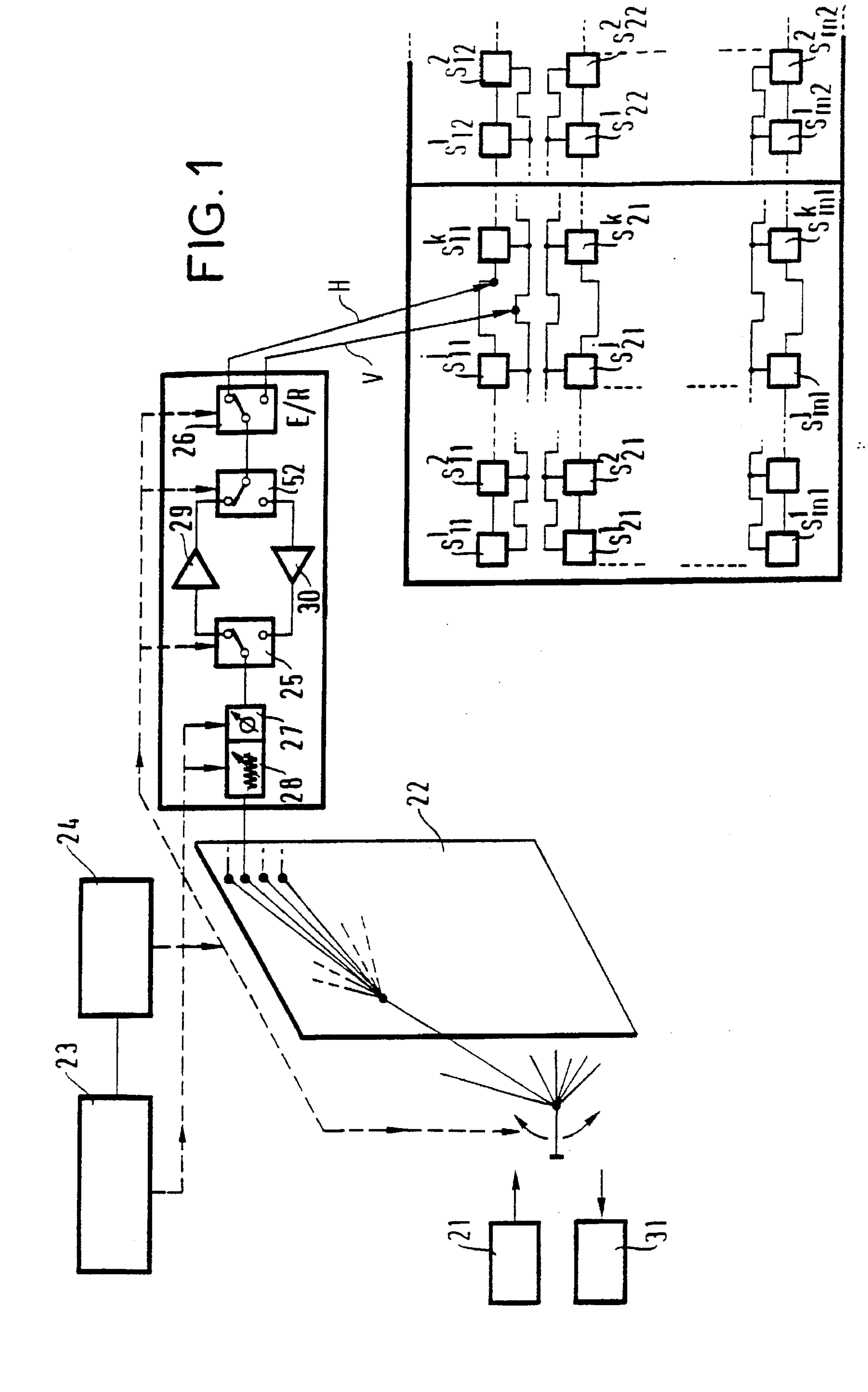
FIG. 1, already described, is a diagrammatic representation of one example of a prior art active radar antenna using orthogonal linear polarizations, together with its active T/R modules and its array elements.
Figure 2:
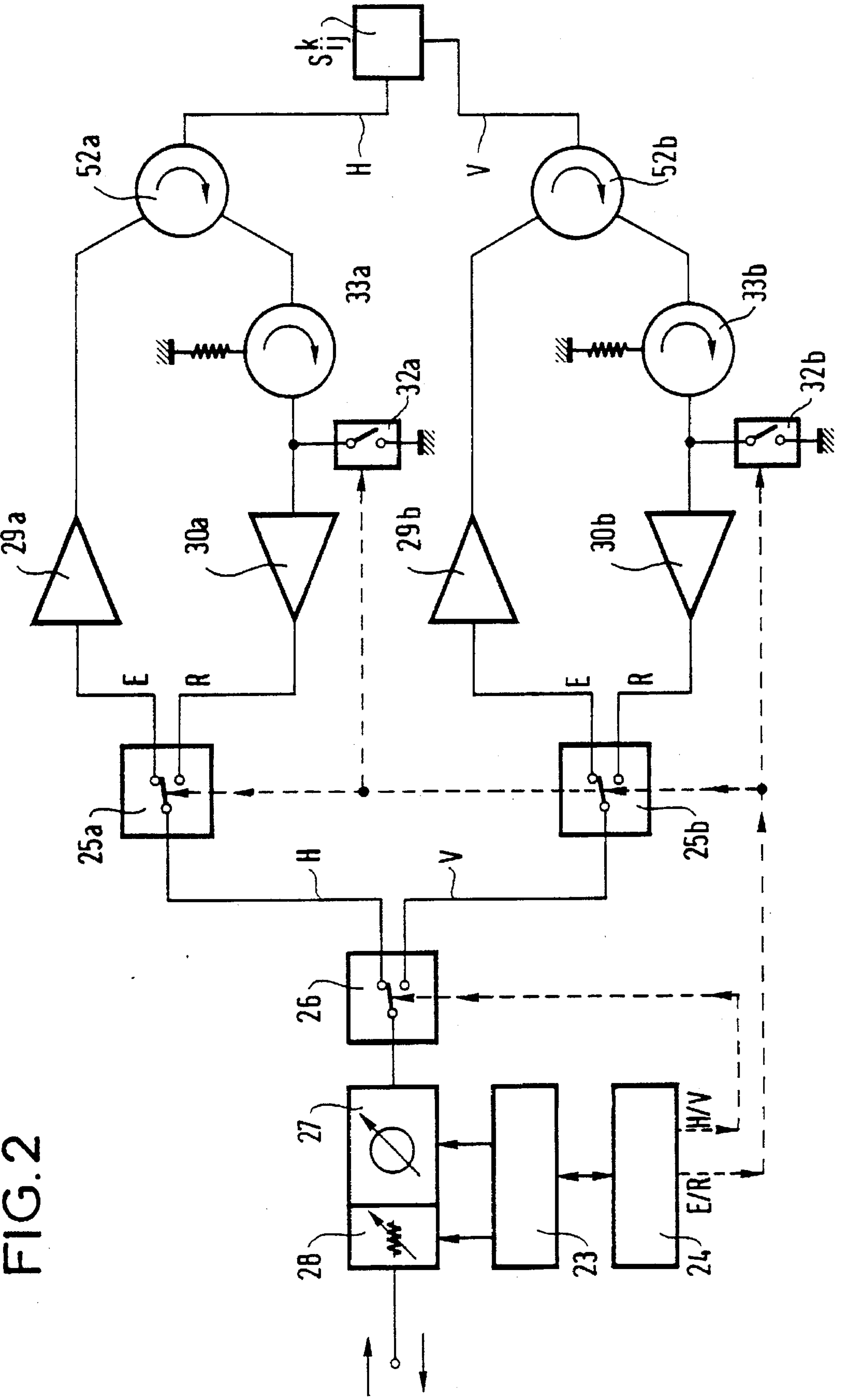
FIG. 2, already described, is a diagrammatic representation of one example of a prior art T/R circuit having lower losses than the FIG. 1 circuit.
Figure 3:
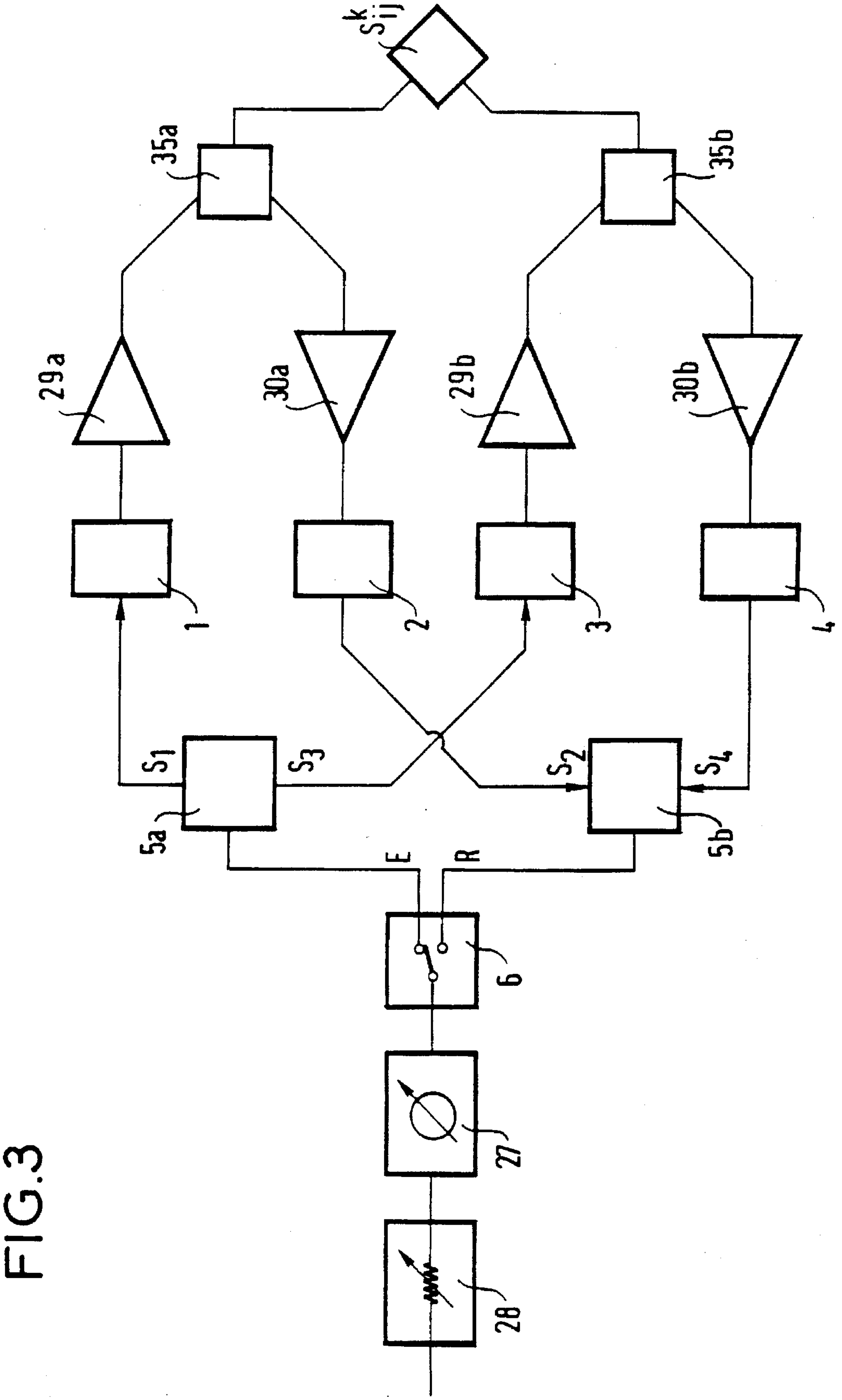
FIG. 3 is a diagrammatic representation of one example of an active T/R circuit in accordance with the invention.

FIG. 3 is a diagrammatic representation of a first example of an active T/R circuit in accordance with the invention. Compared to FIGS. 1 and 2, already described, the diagram has been simplified by eliminating the environment of the circuit shown; nevertheless, this circuit is intended to be implemented as in the prior art circuits between a divider/combiner (22 in FIG. 1) and an array of radiator elements $S_{ij}$. As in the previous figures, the controllable phase-shifter 27 and the controllable attenuator 28 are controlled by instructions from the control computer (not shown) and the T/R switch 6 is controlled by a clock (not shown). The components 35*a*, 35*b* are equivalent either to the T/R switches (52 in FIG. 1) or to the circulators (52*a*, 52*b* in FIG. 2) the function of which in either case is either to pass transmit power from the power amplifiers 29*a*, 29*b* to the respective array elements $S_{ij}$ or to pass received signals from the array element $S_{ij}$ to the low-noise amplifiers 30*a*, 30*b*.

The components 5*a* are dividers and the components 5*b* are combiners the nature of which is explained below.

The components 1, 2, 3, 4 are phase-shifters at least one of which is a controllable phase-shifter on a transmit channel ($S_1$ or $S_3$) and at least one of which is a controllable phase-shifter on a receive channel ($S_2$ or $S_4$). According to the invention there may therefore be just two controllable phase-shifters, for example the phase-shifters 3 and 4, in which case the components 1 and 2 can be eliminated from the schematic. Various embodiments of the invention can be based on this general schematic, in particular by exploiting the various possibilities in respect of the components 1, 2, 3, 4; some of these possibilities are described below.

In a first embodiment of the invention the component 5*a* is a power divider and the component 5*b* is a power combiner, the two components operating in phase, i.e. the phase of the signals $S_1$ and $S_3$ is the same and the signals $S_2$ and $S_4$ are also combined in-phase. In this first embodiment of the invention, which is the simplest implementation, the components 1 and 2 are dispensed with; the components 3 and 4 are one-bit phase-shifters which introduce a phase-shift of 0° or 180° depending on the value of a control bit supplied by control means (not shown).

The array element $S^k_{ij}$ shown in FIG. 3 is a square etched patch whose orientation is important. The square is oriented with its diagonals vertical and horizontal. The lines from the switches or circulators 35*a*, 35*b* to the patch are mutually perpendicular and at 45° to the diagonals of the patch.

In an ideal circuit as shown in FIG. 3, ignoring insertion losses and propagation time-delays in the phase-shifters 3 and 4, the amplitude of the signals $S_1$ and $S_3$ is the same and the signals $S_2$ and $S_4$ also have the same amplitude. If the control bit for the phase-shifter 3 commands a 0° phase-shift both ports are excited in phase by the two power amplifiers 29*a*, 29*b* which produces a wave with horizontal linear polarization. On the other hand, if the control bit for the phase-shifter 3 commands a 180° phase-shift the two ports are excited in phase opposition by the two power amplifiers 29*a*, 29*b* which produces a wave with vertical linear polarization.

Likewise for reception, if the control bit for the phase-shifter 4 commands a 0° phase-shift both ports are excited in phase and after amplification by the two low-noise amplifiers 30*a*, 30*b* the signals are combined in-phase by the combiner 5*b* which corresponds to a received wave having a horizontal linear polarization. On the other hand, if the control bit for the phase-shifter 4 commands a 180° phase-shift the combiner 5*b* has the signals $S_2$ and $S_4$ on its inputs and the signal $S_4$ has undergone a phase-shift of 180° , so that, with both ports excited in phase opposition the result after amplification by the two low-noise amplifiers 30*a*, 30*b* corresponds to a wave having a vertical linear polarization.

In practise, exact vectorial synthesis of the required polarizations in the manner described above must take into account the insertion losses of the phase-shifters 3, 4 and the gains and insertion phase-shifts of the amplifiers 29*a*, 29*b*, 30*a*, 30*b*. For example, the real amplifiers would be matched (29*a, b* and 30*a, b*) to have the same gain and the same insertion phase-shift and the insertion loss of the phase-shifters 3, 4 would be compensated by a slight unbalance of the dividers 5*a*/combiners 5*b*: for example, if the phase-shifter loss were 1 dB the dividers/combiners would be designed to have the same offset between the amplitudes of their respective two output/input ports. Note also that the 0° and 180° states of the phase-shifters must have the same insertion loss, as the person skilled in the art knows very well, regardless of the technology in which they are implemented. If it were difficult to match the gain and insertion phase-shift of the two amplifiers (as in the case of the MMIC technology, for example) the two channels would have to be balanced using devices to vary these parameters added to the circuit of FIG. 3.

This circuit can also produce two orthogonal circular polarizations with 90° hybrid couplers 5*a*, 5*b* replacing the phase dividers/combiners previously described. With a hybrid coupler 5*a* on the transmit channel, for example, both power amplifier subsystems would carry the same signal except that the signal $S_3$ would be phase-shifted 90° relative to the signal $S_1$ (when the value of the phase-shifter 3 is 0° ). Patch excitation via two orthogonal ports with a signal $S_3$ at the first port phase-shifted 90° relative to the signal $S_1$ at the orthogonal second port produces a wave having right circular polarization, for example. By toggling the control bit of the phase-shifter 3 a phase-shift of 180° is applied to the signal $S_3$ which is equivalent to a phase-shift of –90° relative to the signal $S_1$. The result is a wave radiated with left circular polarization.

The receive channel can synthesize waves with right and left circular polarization in the same way, the design of the transmit and receive channels being entirely symmetrical.

This first example has shown the features of the circuit in accordance with the invention which are responsible for its advantages as compared with the prior art: the two amplifier channels in parallel operate simultaneously in transmit and receive modes. This doubles the power as compared with the prior art configuration. What is more, the losses of the dividers and phase-shifters have no influence on the radar link balance or the figure of merit of the antenna as they occur on the input side of the transmit power amplifiers and on the output side of the receive low-noise amplifiers.

Further embodiments of the invention are now discussed in relation to FIG. 3. For example, the components 35*a*, 35*b* could obviously be T/R switches controlled by the clock (not shown) or circulators, so that the signal could pass from the power amplifiers 29*a*, 29*b* to the array element $S_{ij}$, or conversely from the array element $S_{ij}$ to the low-noise amplifiers 30*a*, 30*b*, but under no circumstances from the power amplifiers 29*a*, 29*b* to the low-noise amplifiers 30*a*, 30*b*.

In another variant of FIG. 3, the circuit could have the capability to synthesize orthogonal linear polarizations or orthogonal circular polarizations. All this requires is for two-bit phase-shifters to be added to blocks 3 and 4 in the diagram with phase dividers/combiners for units 5*a*, 5*b*. The value of the first control bit selects a phase of 0° or 180° , as before, to which is added the 0° or 90° phase determined by the value of the second control bit. If the second control bit determines a 0° phase-shift the situation is the previous orthogonal linear polarization situation; on the other hand, if the second control bit determines a 90° phase-shift the circuit is equivalent to that described previously in which the units 5*a*, 5*b* were 90° hybrid couplers, i.e. the configuration is one for synthesizing right and left circular polarizations.

The same performance can be achieved with a different circuit in which the units 5*a*, 5*b* are 90° hybrid couplers and one-bit 0° or 90° phase-shifters are included in boxes 1, 2 in FIG. 3 and one-bit 0° or 180° phase-shifters are included in boxes 3, 4 in the same figure. The result is exactly the same as that explained in the previous paragraph. This configuration provides an additional advantage if the losses of the phase-shifters 1, 2, 3, 4 are the same because the hybrid couplers 5*a*, 5*b* can then be balanced couplers, which are less costly than unbalanced couplers.

This observation leads to two further embodiments of the invention, again relating to FIG. 3. An embodiment for synthesizing orthogonal linear polarizations comprises two 90° hybrid couplers 5*a*, 5*b* and four one-bit 0° or 90° phase-shifters 1, 2, 3, 4. As in the first embodiment described a horizontal transmit polarization results if phase-shifter 1 has a 0° phase-shift and phase-shifter 3 has a 90° phase-shift (which is added to the 90° phase-shift of the hybrid coupler); the same applies to reception, with 0° for phase-shifter 2 and 90° for phase-shifter 4. Vertical polarization is obtained by using the other phase-shift at each phase-shifter. As before, the implementation can be simplified because with identical phase-shifters on all four channels it is sufficient to select components having the same insertion loss and phase-shift to approximate the ideal polarization synthesizer circuit.

A final variant of FIG. 3 synthesizes orthogonal circular polarizations using the same strategy: four one-bit 0° or 90° phase-shifters 1, 2, 3, 4, but with phase dividers/combiners 5*a*, 5*b*. In this case right circular polarization is obtained with a 90° phase-shift at phase-shifters 1, 3 and a 0° phase-shift at phase-shifters 2, 4; conversely, left circular polarization is obtained with a 90° phase-shift at phase-shifters 2, 4 and a 0° phase-shift at phase-shifters 1 and 3.

Figure 4:
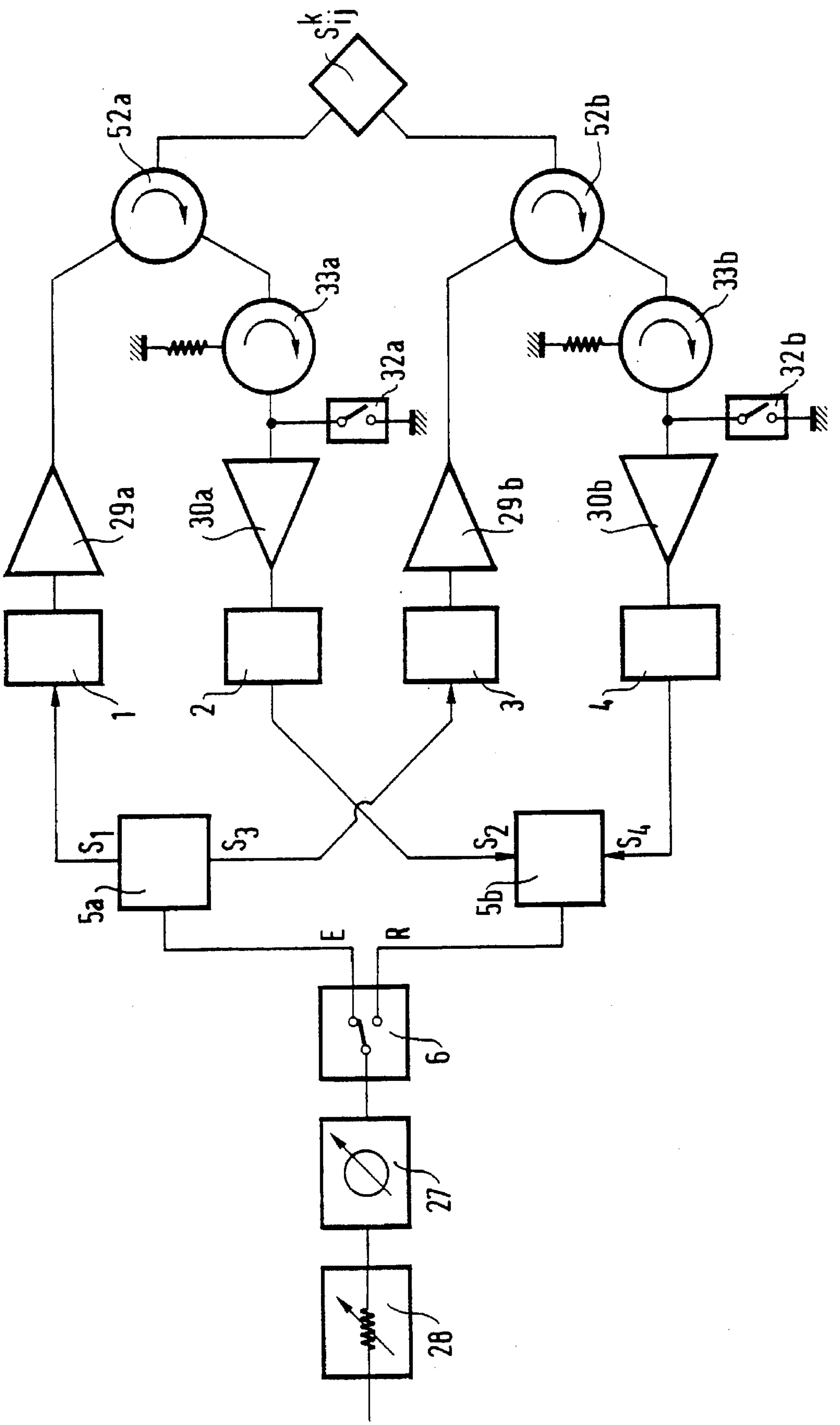
FIG. 4 is a diagrammatic representation of a second example of an active T/R circuit in accordance with the invention, which also has the features of FIG. 2.

FIG. 4 shows another embodiment of a T/R circuit in accordance with the invention in which the FIG. 2 prior art features have been added to the FIG. 3 circuit of the invention. To be more precise, to reduce the losses associated with switches at positions 35*a*, 35*b* in FIG. 3, circulators 52*a*, 52*b* have been substituted for the switches. This is equivalent to one of the embodiments already discussed with reference to FIG. 3. However, protection against reflections due to mismatching of the antenna is additionally inserted into the receive channel. This protection is provided by switches 32*a*, 32*b* which are controlled by the clock and ground the inputs of the low-noise amplifiers during transmission. A further advantage is obtained by inserting a second circulator on each receive channel 33*a*, 33*b* to eliminate any reflections from these switches 32*a*, 32*b* when closed, as any reflections at this point would reduce the transmit power, especially if the direct and reflected signals were to combine in phase opposition.

Figure 5:
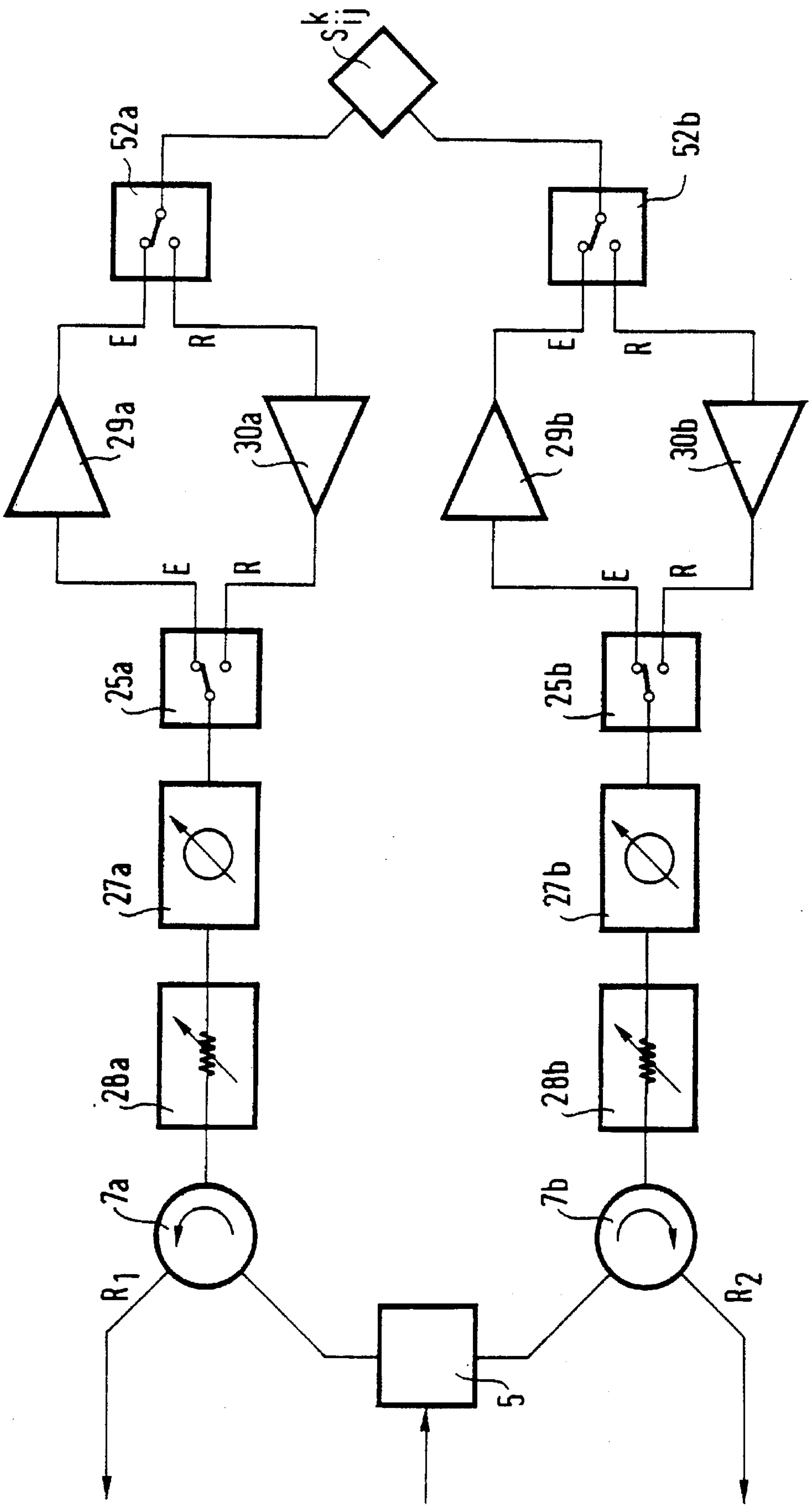
FIG. 5 is a diagrammatic representation of an embodiment of the invention that can synthesize any polarization.

FIG. 5 is a diagram showing the most general implementation of a polarization synthesizer circuit in accordance with the invention. This circuit can synthesize any polarization: linear, circular or elliptical with arbitrary axes and can easily switch between these various possibilities provided that its phase-shifters 27*a*, 27*b* and its attenuators 28*a*, 28*b* can be controlled in a quasi-continuous manner. The instantaneous orientation of the polarization vector is then determined by the relative phases due to the phase-shifters 27*a*, 27*b*, which can assume arbitrary and time-varying values, and the relative amplitude of the signals passing through the controllable attenuators can also assume arbitrary and time-varying values, to determine the length of each projection of the electric field vector onto the two orthogonal axes, corresponding to the polarizations generated at each array element port. The polarization is linear if the phase-shift is 180° ; it is circular if it is +/−90° and the attenuations on the two channels are the same; the polarization is elliptical if the phase-shift takes a different value, or linear if the attenuations of the two channels are different.

In a practical implementation of this embodiment, as shown in FIG. 5, two controllable phase-shifters 27*a*, 27*b* and two controllable attenuators 28*a*, 28*b* are used. Four of each could of course be used in the FIG. 3 or FIG. 4 configuration, with one of each in each of boxes 1, 2, 3, 4 in FIGS. 3 and 4. Circularors 7*a*, 7*b* have been added to the FIG. 5 configuration to separate the transmit and receive signals according to the direction in which they propagate in the circuit.

The transmit signal reaches a power divider and the in-phase output signals of the divider are sent to the two circularors 7*a*, 7*b*. There are then two T/R circuits in parallel, each as described with reference to the preceding figures, with the same reference numbers identifying the same components in all the figures. These two circuits deliver signals to two orthogonal ports of the array element $S_{ij}$ with their relative phase and amplitude determined by the respective controllable phase-shifters and attenuators 27*a*, 27*b*, 28*a*, 28*b*.

On the other hand, the receive signals from the array element $S_{ij}$ are taken from the two orthogonal ports and the two signals are amplified separately by the low-noise amplifiers 30*a*, 30*b*. Their relative phase and amplitude are set by the respective controllable phase-shifters and attenuators 27*a*, 27*b*, 28*a*, 28*b*, according to the polarization of the received wave to be looked at. These signals are then passed via the circularors 7*a*, 7*b* to separate receive channels for signal processing in an appropriate computer (not shown).

The facility to synthesize an arbitrary polarization can provide an adaptive antenna, i.e. an antenna which can reconfigure itself to allow for an environment polluted by deliberate or accidental unwanted transmissions. The basic principle is to measure the dominant polarization of the radio frequency environment in the frequency band within which the equipment operates with the attenuators and the phase-shifters in a reference state. The transmit polarization is then selected to be orthogonal to this dominant polarization. This mode of operation can improve performance considerably in the presence of deliberate jamming with fixed polarization or if unwanted specular reflections are masking a non-specular target radar with a small equivalent cross-section.

Figure 6:
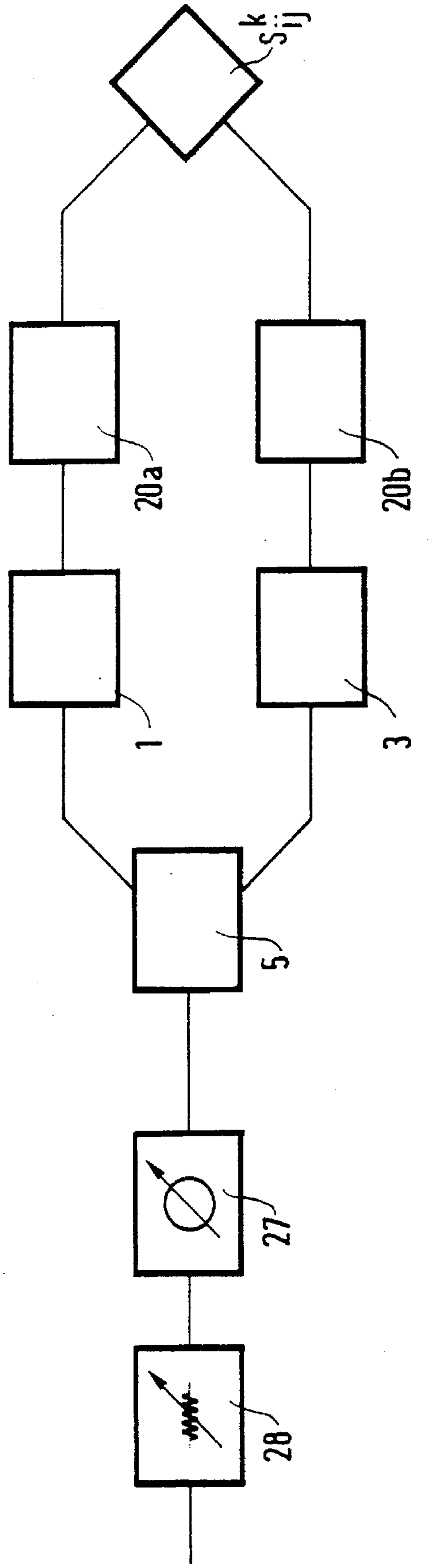
FIG. 6 is a diagrammatic representation of an embodiment of the invention constituting a transmit or receive microwave circuit synthesizing a variable polarization.

FIG. 6 is a diagrammatic representation of the simplest configuration of a microwave circuit in accordance with the invention. This circuit can either transmit or receive synthesized polarization microwave signals, depending on the specifications of the components used. Such circuits find applications in multistatic radar antennas, for example, and in telecommunication antennas.

In a first implementation of the circuit shown in FIG. 6, the circuit amplifies signals to be transmitted. A low-level signal reaching the input of the controllable attenuator 28 and attenuated thereby is then passed through a controllable phase-shifter 27 to suit the signal amplitude and phase of this circuit to its location within the array of radiator elements (not shown). As in the previous figures (and especially FIG. 3), the component 5 is a power divider, either an in-phase divider or a 90° phase-shift hybrid coupler.

The boxes 1, 3 represent zero-bit, one-bit or two-bit controllable phase-shifters with phase-shift values of 0°—0° , 0°–90° or 0°–180° , as described with reference to FIG. 3. The circuit is exactly as described with reference to FIG. 3 in so far as the transmit channel is concerned. The components 20*a* , 20*b* are then power amplifiers which feed the patches $S^k_{ij}$ via feed paths inclined at 45° to the horizontal.

In a second implementation of the circuit shown in FIG. 6, the circuit amplifies received signals. A very low-level signal reaching the array element $S^k_{ij}$ is conveyed by the feed paths inclined at 45° to the horizontal to the low-noise amplifiers 20*a*, 20*b*. The amplified signals are then phase-shifted by 0, 90, 180 or 270° (=−90° ) by the zero-bit, one-bit or two-bit controllable phase-shifters 1, 3. The phase-shifted signals are combined, either in-phase or with a relative phase-shift of 90° , by means 5 which are either an in-phase combiner or a hybrid coupler with a 90° phase-shift between its two inputs. The phase and amplitude of the signals are then varied according to the location of the array element within the array antenna.

The controllable phase-shifters can of course be controlled in a quasi-continuous manner, as in FIG. 5, to provide greater flexibility in synthesizing polarizations, if necessary.

In the examples shown in the figures the only array element shown is a square patch oriented with its diagonals horizontal and vertical. This is to simplify the explanation. It is clear, however, that the invention is at the level of the T/R circuit and that the array elements can be of different types and differently oriented. The patches can be oriented with the sides horizontal and vertical and energized along the diagonals from orthogonal ports. As already mentioned the propagation lines leading to the ports can be of different types, for example: coaxial, microstrip, triplate, etc.

The array elements can be annular slots photo-chemically etched in a top ground plane, excited by lines at 45° to the H and V directions in a bottom plane or on the other side of the substrate carrying the ground plane and the slots, or on a suspended second substrate, the two substrates being held apart by spacers or a material having low losses at microwave frequencies, such as a foam or honeycomb material. These arrays of radiator elements and their feed arrangements are well known to the person skilled in the art and are described, for example, in *Proceedings of Military Micro-*

*waves* 1992, "Antennas for space scatterometers and SARS", by R. Petersson, which description of the prior art constitutes an integral part of this application.

Other, more conventional components can be used, such as square, circular or hexagonal mouth horns excited in two directions at 45° to the H and V polarizations. Another array element, yielding a greater bandwidth, is the notch antenna described in detail in *Proceedings of Antenna and Propagation Symposium*, 1974, IEEE, "A broadband stripline array element", by L. R. Lewis et al., which description of the prior art constitutes an integral part of this application.

The circuits shown in the figures by way of example can be implemented in various technologies without departing from the scope of the invention: although the MMIC technology is preferred for its low mass and small size and for its manufacturing costs which are reasonable for mass production, higher transmit powers can be tolerated by substituting circulators for the integrated circuit switches on the output side of the power amplifiers. Circulators are heavier and bulkier but their losses are lower than those of MMIC switches.

On the other hand, some aspects of performance can be optimized using hybrid technology: discrete amplifiers can handle higher transmit powers and provide a better receive noise factor than MMIC amplifiers. Some of the options discussed in relation to FIG. 3 would be preferred over others depending on the implementation technology adopted. Ultimate performance can be optimized in terms of the many criteria discussed above to suit the application of the antenna. In all cases the use of the T/R circuit in accordance with the invention improves performance considerably, especially with respect to the signal to noise ratio.

I claim:

1. An alternate transmit/receive (T/R) microwave circuit for variable synthesized polarization array antennas, comprising:

first and second transmit power amplifiers for applying excitation signals for at least two orthogonal polarizations to array elements via a first transmission channel of a first input/output channel and a second transmission channel of a second input/output channel, respectively, at least one of said first and second transmission channels including a controllable phase shifter which shifts a phase of said excitation signals; and first and second low-noise receive amplifiers for receiving, via a first receive channel of said first input/output channel and a second receive channel of said second input/output channel, respectively, at least two signals having orthogonal polarizations detected by said array elements, at least one of said first and second receive channels including a controllable phase shifter which shifts a phase of said signals being received; and wherein said first and second transit power amplifiers operate simultaneously during transmission of said excitation signals and said first and second low-noise amplifiers operate simultaneously during reception of said at least two signals.

2. A circuit according to claim 1, wherein said two input/output channels are connected to said array elements to generate polarizations inclined at 45° to the horizontal so that by adjusting the phase-shifters it is possible to synthesize the standard horizontal H or vertical V polarization.

3. A circuit according to claim 1 or claim 2, wherein said two power amplifiers are fed by an in-phase power divider to facilitate synthesis of orthogonal linear polarizations.

4. A circuit according to claim 1, wherein said two power amplifiers are fed by a hybrid coupler having two outputs with a relative phase difference of 90° to facilitate synthesis of circular polarizations.

5. A circuit according to claim 1, wherein said phase-shifters are one-bit digital controllable phase-shifters and the value of said one bit represents either 0° or 180°.

6. A circuit according to claim 1, wherein said phase-shifters are two-bit digital controllable phase-shifters and the value of a first bit represents either 0° or 180° and the value of the second bit represents either 0° or 90° so that any of the following four standard polarizations can be synthesized: linear H or V, right or left circular.

7. A circuit according to claim 1, wherein said phase-shifters are one-bit digital controllable phase-shifters and the value of said one bit represents either 0° or 90°.

8. A circuit according to claim 1, further comprising a controllable attenuator which varies the gain of at least one of said power amplifiers.

9. A circuit according to claim 1, further comprising a controllable attenuator which varies the gain of at least one of said low-noise amplifiers.

10. A circuit according to claim 1, wherein said phase-shifters are controllable in one of the analog domain and digital domain, and said circuit further comprises at least two attenuators, controllable in one of the analog domain and digital domain, for synthesizing any linear, circular or elliptical polarization.

11. A circuit according to claim 10, wherein said phase-shifters and said attenuators are controllable in the analog domain.

12. A circuit according to claim 10, wherein said phase-shifters and said attenuators are controllable in the digital domain using a large number of bits for synthesizing any linear, circuit or elliptical polarization.

13. An array antenna with variable synthesized polarization at its array elements, including a transmit/receive circuit comprising:

first and second transmit power amplifiers for applying excitation signals for at least two orthogonal polarizations to array elements via a first transmission channel of a first input/output channel and a second transmission channel of a second input/output channel, respectively, at least one of said first and second transmission channels including a controllable phase shifter which shifts a phase of said excitation signals; and first and second low-noise receive amplifiers for receiving, via a first receive channel of said first input/output channel and a second receive channel of said second input/output channel, respectively, at least two signals having orthogonal polarizations detected by said array elements, at least one of said first and second receive channels including a controllable phase shifter which shifts a phase of said signals being received; and wherein said first and second transit power amplifiers operate simultaneously during transmission of said excitation signals and said first and second low-noise amplifiers operate simultaneously during reception of said at least two signals.

14. An array antenna according to claim 13, wherein the array elements are printed circuit (patch) type array elements.

15. An array antenna according to claim 13, wherein the array elements are in the form of annular slots photochemically etched on one side of a dielectric substrate having low losses at microwave frequencies and excited by photo-chemically etched lines on the opposite side of said substrate.

16. An array antenna according to claim 15, wherein said slots are excited by lines photo-chemically etched on a suspended substrate.

17. A circuit according to claim 1, wherein said circuit is implemented in the MMIC technology.

18. An array antenna according to claim 13, wherein said array antenna is an adaptive polarization antenna.

* * * * *